United States Patent
Stöppelmann et al.

(10) Patent No.: US 10,875,999 B2
(45) Date of Patent: Dec. 29, 2020

(54) POLYAMIDE MOULDING COMPOUNDS WITH LOW RELATIVE PERMITTIVITY

(71) Applicant: EMS-PATENT AG, Domat/Ems (CH)

(72) Inventors: Georg Stöppelmann, Bonaduz (CH); Philipp Harder, Chur (CH); Etienne Aepli, Domat/Ems (CH); Ronny Ebling, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 38 days.

(21) Appl. No.: 15/826,177

(22) Filed: Nov. 29, 2017

(65) Prior Publication Data
US 2018/0155545 A1 Jun. 7, 2018

(30) Foreign Application Priority Data
Dec. 2, 2016 (EP) .................................. 16201945

(51) Int. Cl.
*C08L 77/02* (2006.01)
*C08L 77/06* (2006.01)
*C08K 3/40* (2006.01)

(52) U.S. Cl.
CPC .............. *C08L 77/02* (2013.01); *C08K 3/40* (2013.01); *C08L 77/06* (2013.01); *C08L 2203/20* (2013.01); *C08L 2205/02* (2013.01)

(58) Field of Classification Search
CPC ............ C08L 77/02; C08L 77/06; C08K 3/40
See application file for complete search history.

(56) References Cited

U.S. PATENT DOCUMENTS

| | | | |
|---|---|---|---|
| 6,624,794 B1 * | 9/2003 | Wendt | H01Q 1/1271 343/713 |
| 8,552,103 B2 * | 10/2013 | Rexin | C08L 77/02 524/442 |
| 2008/0167415 A1 | 7/2008 | Stoeppelmann et al. | |

(Continued)

FOREIGN PATENT DOCUMENTS

| | | |
|---|---|---|
| EP | 1 942 147 A1 | 7/2008 |
| JP | H05-274914 A | 10/1993 |

(Continued)

OTHER PUBLICATIONS

"Glass Fiber Data Sheet Chopped Strands CD 7928," LanXess Deutschland GmbH, HPM Business Unit, 2 pgs. (2013). Downloaded Apr. 11, 2017. https://techcenter.lanxess.com/scp/emea/en/docguard/LANXESS_Glass_Fiber_CS_7928.pdf?docid=63488.

(Continued)

*Primary Examiner* — Brieann R Johnston
(74) *Attorney, Agent, or Firm* — Leydig, Voit & Mayer, Ltd.

(57) ABSTRACT

Disclosed are polyamide moulding compounds having a relative permittivity of no more than 3.5 at 2.45 GHz, and having the following components: (A) 25 to 80% by weight of a mixture made of at least one partially crystalline aliphatic polyamide and at least one amorphous or microcrystalline polyamide, (B) 20 to 65% by weight of at least one glass filler, and (C) 0 to 10% by weight of additives, the sum of components (A), (B) and (C) producing 100% by weight. The polyamide moulding compounds are for use in components of devices such as laptops and mobile phones.

15 Claims, 2 Drawing Sheets

(56) References Cited

U.S. PATENT DOCUMENTS

| | | | | |
|---|---|---|---|---|
| 2009/0005502 A1* | 1/2009 | Topoulos | ................ | C08L 77/00 |
| | | | | 524/606 |
| 2010/0237271 A1* | 9/2010 | Stoppelmann | .......... | C08L 77/00 |
| | | | | 252/62.54 |
| 2014/0329944 A1* | 11/2014 | Harder | ................... | C09K 21/12 |
| | | | | 524/133 |
| 2015/0287493 A1* | 10/2015 | Aepli | ....................... | C08K 7/06 |
| | | | | 252/509 |
| 2015/0291795 A1* | 10/2015 | Aepli | ....................... | C08L 77/06 |
| | | | | 524/151 |
| 2017/0058123 A1* | 3/2017 | Sutterlin | ................. | C08L 51/06 |
| 2017/0107337 A1* | 4/2017 | Stoppelmann | .......... | C08L 77/06 |
| 2019/0177519 A1* | 6/2019 | Wang | ..................... | C08L 25/08 |

FOREIGN PATENT DOCUMENTS

| | | |
|---|---|---|
| JP | 2010-168502 A | 8/2010 |
| JP | 2014-043549 A | 3/2014 |
| JP | 2014-043577 A | 3/2014 |
| WO | WO 2012/037219 A1 | 3/2012 |
| WO | WO-2017203467 A1 * 11/2017 | ............... C08K 7/14 |

OTHER PUBLICATIONS

Ravaine et al., "Dielectric relaxation in alkali metal oxide conductive glasses studied by complex impedance measurements," *Journal of the Chemical Society. Faraday Transactions II*, 71: 1935 (1975).

European Patent Office, Extended European Search Report in European Patent Application No. 16 201 945.9 (dated Apr. 21, 2017).

Nanjo, "Composite material course: Introduction to FRP components, Chapter 2 Components and Types-Glass fiber," *Journal of Japan Society for Composite Materials*, 33(4): 141-149 (2007).

Japan Patent Office, Notification of Reasons for Refusal in Japanese Patent Application No. 2017-231704 (dated Aug. 27, 2020).

* cited by examiner

POLYAMIDE MOULDING COMPOUNDS WITH LOW RELATIVE PERMITTIVITY

CROSS-REFERENCE TO A RELATED APPLICATION

This application claims the benefit of European Patent Application No. 16 201 945.9, filed Dec. 2, 2016, the disclosure of which is incorporated herein by reference in its entirety for all purposes.

BACKGROUND OF THE INVENTION

The present invention relates to polyamide moulding compounds with low relative permittivity and also moulded articles made of these polyamide moulding compounds and uses thereof.

The low relative permittivity of the polyamide moulding compounds makes it possible to use these for housings, housing parts or other components of devices which communicate via electromagnetic waves at a frequency of 0.3 to 300 GHz, without a significant impairment requiring to be accepted in the transmitting- and receiving properties of these devices. Devices which communicate via such electromagnetic waves are used in different spheres, thus for example in telecommunications, consumer electronics or in the household, in particular transmitting- and receiving devices, mobile phones, tablets, laptops, navigational devices, monitoring cameras, photographic cameras, sensors, diving computers, audio units, remote controls, loudspeakers, headphones, radio sets, television sets, kitchen equipment, door- or gate openers, operating devices for central locking in vehicles, keyless-go vehicle keys, temperature measuring- or temperature display devices, measuring devices and control devices.

Polyamide moulding compounds which have a low relative permittivity, previously termed dielectric constant, are already known from the state of the art.

JP 2010-168502 A describes polyamides with a low dielectric constant, low water absorption and good solubility in a solvent. These polyamides comprise a polymer with repetition units of a polyamide obtained from the reaction of a diamine, which has aromatic amino groups at both ends of a special bifunctional phenylene ether oligomer, with a dicarboxylic acid or a dicarboxylic acid halogenide or a copolymer with a polyamide repetition unit obtained from the reaction of a diamine, which has aromatic amino groups at both ends of a special bifunctional phenylene ether oligomer, or a further diamine with a dicarboxylic acid or a dicarboxylic acid halogenide.

JP 05-274914 A relates to insulating materials made of a polyamide resin with a low dielectric constant. These materials are used in electronic components, such as patch-boards and multichip modules.

Polyamide moulding compounds for the initially mentioned applications are processed, as standard, via injection moulding methods. In addition to a low relative permittivity, the mould shrinkage- and distortion behaviour of the polyamide moulding compounds represents therefore an important property. Furthermore, polyamide moulding compounds which are used, e.g. in the field of telecommunications devices, should be dirt-repellent and display good mechanical properties. The latter can be achieved via incorporation of reinforcing materials, such as glass fibres, into the polyamide moulding compounds, which however in turn exert a negative effect on the relative permittivity of the polyamide moulding compounds.

Starting herefrom, one object of the present invention resided in providing polyamide moulding compounds which, in addition to a low relative permittivity, also are readily processable via injection moulding methods and in particular have good mould shrinkage- and distortion behaviour. Furthermore, the polyamide moulding compounds should have good mechanical properties, in particular good weld line strength and be dirt-repellent.

BRIEF SUMMARY OF THE INVENTION

This object is achieved by the polyamide moulding compounds according to the invention described herein which comprise the following components:
(A) 25 to 80% by weight of a mixture made of
  Aa) 50.1 to 90% by weight of at least one partially crystalline aliphatic polyamide and
  Ab) 10 to 49.9% by weight of at least one amorphous or microcrystalline polyamide,
  the proportions of components Aa) and Ab) adding up to 100% by weight and the mixture of components Aa) and Ab) having, on average, at least 5.7 C atoms, not involved in the amide group, per amide group in the mixture (A),
(B) 20 to 65% by weight of at least one glass filler, consisting of glass with a content of alkali oxides and alkaline earth oxides of 0 to 12% by weight, relative to the composition of the glass, selected from a group consisting of fibres, ground fibres, particles, flakes, balls and mixtures thereof
and
(C) 0 to 10% by weight of additives,
the sum of components (A), (B) and (C) producing 100% by weight and
the polyamide moulding compound having a relative permittivity of no more than 3.5 at 2.45 GHz.

Advantageous embodiments of the polyamide moulding compounds according to the invention are also described.

In addition, moulded articles made of the polyamide moulding compound according to the invention are provided and also special moulded articles are described herein.

DETAILED DESCRIPTION OF THE INVENTION

There is understood by good mechanical properties of the polyamide moulding compound according to the invention, in addition to the weld line strength, the following:
a modulus of elasticity in tension of at least 8,000 MPa, preferably at least 10,000 MPa, particularly preferably of at least 12,000 MPa, and/or
a tearing strength of at least 100 MPa, preferably at least 120 MPa, particularly preferably of at least 140 MPa, and/or
a breaking elongation of at least 1.5%, preferably at least 2.0%, particularly preferably of at least 2.5%, and/or an impact strength of at least 40 kJ/m², preferably at least 50 kJ/m², particularly preferably of at least 60 kJ/m², very particularly preferably of at least 70 kJ/m², and/or a notch impact strength of at least 8 kJ/m², preferably at least 10 kJ/m², particularly preferably of at least 15 kJ/m².

C Atoms Per Amide Group

In the case of AB-polyamides, the number of C atoms between the nitrogen atom and the carbonyl group is equal to the number of C atoms per amide group. An example of AB-polyamides is polyamide 12 which is produced from laurinlactam. The number of C atoms between the nitrogen atom and the carbonyl group here is 11.

In the case of AABB-polyamides, produced from diamines and dicarboxylic acids, the number of C atoms per amide group is produced from the sum of the C atoms ($C_{DA}$) between the two nitrogen atoms of the diamine and the C atoms ($C_{DS}$) between the two carboxy groups of the dicarboxylic acid, divided by 2, i.e. ($C_{DA}+C_{DS}$)/2. Division by 2 is necessary since, from the two nitrogens and the two carboxy groups, two amide groups can be formed. An example of AABB-polyamides is the polyamide MACM12, produced from bis(3-methyl-4-aminocyclohexyl) methane (MACM) and dodecanedioic acid. Since MACM has 15 C atoms between the two nitrogens and dodecanedioic acid 10 C atoms between the two carboxy groups, there are produced (15+10)/2=12.5 C atoms per amide group.

The mixtures of polyamides Aa) and Ab) (=component (A) of the polyamide moulding compounds) have an average number of C atoms, not involved in the amide group, per amide group of at least 5.7. This number of C atoms of at least 5.7 thereby relates to the average of all the polyamides according to Aa) and Ab) in the mixture, the weight ratios of the polyamides in the mixture requiring to be taken into account.

Amorphous or Microcrystalline Polyamides

Amorphous or microcrystalline polyamides show, in Differential Scanning Calorimetry (DSC) according to ISO 11357-2 (2013) at a heating rate of 20 K/min, preferably a melting heat of at most 50 J/g, particularly preferably of at most 25 J/g, very particularly preferably 0 to 22 J/g.

Microcrystalline polyamides are partially crystalline polyamides and have therefore a melting point. However, they have a morphology in the case of which the crystallites have such a small dimension that a plate produced therefrom with a thickness of 2 mm is still transparent, i.e. the light transmission thereof is at least 75%, measured according to ASTM D 1003-13 (2013).

In the case of the microcrystalline polyamides used for the polyamide moulding compound according to the invention, the melting point, measured according to ISO 11357-3 (2013), is preferably at most 255° C.

Amorphous polyamides have, compared with microcrystalline polyamides, a lower melting heat. The amorphous polyamides show, in dynamic Differential Scanning Calorimetry (DSC) according to ISO 11357-2 (2013) at a heating rate of 20 K/min, preferably a melting heat of at most 5 J/g, particularly preferably of at most 3 J/g, very particularly preferably of 0 to 1 J/g.

Amorphous polyamides, because of their amorphicity, have no melting point.

Spellings and Abbreviations for Polyamides and the Monomers Thereof

In the sense of the present invention, there is understood by the term "polyamide" (abbreviation PA) a generic term, this includes homopolyamides and copolyamides. The chosen spellings and abbreviations for polyamides and the monomers thereof correspond to those established in the ISO standard 1874-1 (2011, (D)). The abbreviations used therein are used subsequently synonymously to the IUPAC names of the monomers, in particular the following abbreviations for monomers occur, MACM for bis(4-amino-3-methylcyclohexyl)methane (also termed 3,3'-dimethyl-4,4'-diaminodicyclohexylmethane, CAS no. 6864-37-5), PACM for bis(4-aminocyclohexyl)methane (also termed 4,4'-diaminodicyclohexylmethane, CAS no. 1761-71-3), TMDC for bis(4-amino-3,5-dimethylcyclohexyl)methane (also termed 3,3',5,5'-tetramethyl-4,4'-diaminodicyclohexylmethane, CAS no. 65962-45-0), T for terephthalic acid (CAS no. 100-21-0), I for isophthalic acid (CAS no. 121-95-5).

Quantity Data

The polyamide moulding compounds according to the present invention comprise components (A) to (C), the proviso applies thereby that components (A) to (C) add up in total to 100% by weight. The set ranges of the quantity data for the individual components (A) to (C) should be understood such that, within the prescribed ranges, an arbitrary quantity can be selected for each of the individual components, provided the strict proviso is fulfilled that the sum of all the components (A) to (C) produces 100% by weight.

Relative Permittivity

"Permittivity" ($\varepsilon$) is an indicator of the behaviour of the molecules when introduced into an electrical field. It is linked to "relative permittivity" ($\varepsilon_r$) and "vacuum permittivity" ($\varepsilon_0$) via the equation $\varepsilon=\varepsilon_r \cdot \varepsilon_0$. "Relative permittivity" ($\varepsilon_r$) represents a material-dependent value and is the quotient of "permittivity" ($\varepsilon$) and "vacuum permittivity" ($\varepsilon_0$). In addition to the type of material, "relative permittivity" ($\varepsilon_r$) also depends upon the frequency of the electrical field and the temperature. Relative permittivity is determined preferably according to IEC 61189-2-721 (2015).

Polyamide Moulding Compound

According to a preferred embodiment of the present invention, the distortion of the polyamide moulding compound is no more than 0.5%, preferably no more than 0.4% and particularly preferably no more than 0.3%. The distortion is thereby determined preferably according to ISO 294-3 (2002).

According to another preferred embodiment of the present invention, the mixture of components Aa) and Ab) has at least 6.5, preferably 8.5 and particularly preferably 10.0 C atoms not involved in the amide group.

A further preferred embodiment of the present invention provides that least one partially crystalline, aliphatic polyamide Aa) is selected from the group consisting of PA 10, PA 11, PA 12, PA 516, PA 610, PA 612, PA 614, PA 616, PA 618, PA 1010, PA 1012, PA 1014, PA 1016, PA 1018 and mixtures thereof, PA 10, PA 11, PA 12, PA 516, PA 612, PA 616, PA 1010, PA 1012, PA 1016, PA 1212 and the mixtures thereof being preferred.

According to a preferred embodiment of the present invention, the at least one amorphous or microcrystalline polyamide Ab) is selected from the group consisting of PA 6I/6T, PA MACM9, PA MACM10, PA MACM12, PA MACM13, PA MACM14, PA MACM16, PA MACM17, PA MACM18, PA PACM10, PA PACM12, PA PACM13, PA PACM14, PA PACM16, PA PACM17, PA PACM18, PA TMDC10, PA TMDC12, PA TMDC13, PA TMDC14, PA TMDC16, PA TMDC17, PA TMDC18, PA MACM10/10, PA MACMI/12, PA MACMT/12, PA 6I/MACMI/MACMT, PA MACMI/MACMT/12, PA MACMI/MACMT/MACM12, PA MACMI/MACMT/MACM12/12, PA 6I/6T/MACMI/MACMT/12, PA 6I/6T/MACMI, PA MACMI/MACM36, PA MACMT/MACM36, PA MACMI/

MACM12, PA MACMT/MACM12, PA MACM6/11, PA MACM10/10, PA MACM12/PACM12, PA MACM14/PACM14, PA MACM18/PACM18 and mixtures thereof, PA 6I/6T, PA MACM12, PA MACM14, PA TMDC12, PA TMDC14, PA MACMI/12, PA 6I/6T/MACMI/MACMT, PA MACMI/MACMT/12, PA MACMI/MACMT/MACM12, PA 6I/6T/MACMI/MACMT/12, PA MACM10/10, PA MACM12/PACM12, PA MACM14/PACM14, PA MACM18/PACM18 and mixtures thereof being preferred, PA 6I/6T, PA MACM12, PA MACMI/12, PA MACMI/MACMT/12, PA MACMI/MACMT/MACM12, PA MACM12/PACM12 and mixtures thereof being particularly preferred.

Another preferred embodiment of the present invention provides that the amorphous or microcrystalline polyamide Ab) has a glass transition temperature of at least 120° C., preferably of at least 140° C., particularly preferably of at least 155° C. and most preferably of at least 180° C. The glass transition temperature is thereby determined preferably according to ISO 11357-2 (2013).

According to another preferred embodiment of the present invention, the proportion of partially crystalline polyamide Aa) of component (A) is 60 to 85% by weight and preferably 65 to 80% by weight.

According to a preferred embodiment of the present invention, the proportion of amorphous or microcrystalline polyamide Ab) of component (A) is 15 to 40% by weight and preferably 20 to 35% by weight.

Another preferred embodiment of the present invention provides that the proportion of components (A) in the polyamide moulding compound is 34.9 to 69.9% by weight, preferably 39.7 to 59.7% by weight and particularly preferably 44.5 to 54.4% by weight, relative to the total weight of the polyamide moulding compound.

According to another preferred embodiment of the present invention, the proportion of component (B) in the polyamide moulding compound is 30 to 65% by weight, preferably 40 to 60% by weight and particularly preferably 45 to 55% by weight, relative to the total weight of the polyamide moulding compound.

According to another preferred embodiment of the present invention, the proportion of components (C) in the polyamide moulding compound is 0.1 to 8% by weight, preferably 0.3 to 6% by weight and particularly preferably 0.5 to 5% by weight, relative to the total weight of the polyamide moulding compound.

Another preferred embodiment of the present invention provides that the proportion of components (A) in the polyamide moulding compound is 34.9 to 69.9% by weight, preferably 39.7 to 59.7% by weight and particularly preferably 44.5 to 54.4% by weight, relative to the total weight of the polyamide moulding compound, and
the proportion of component (B) in the polyamide moulding compound is 30 to 65% by weight, preferably 40 to 60% by weight and particularly preferably 45 to 55% by weight, relative to the total weight of the polyamide moulding compound, and
the proportion of components (C) in the polyamide moulding compound is 0.1 to 8% by weight, preferably 0.3 to 6% by weight and particularly preferably 0.5 to 5% by weight, relative to the total weight of the polyamide moulding compound.

According to a preferred embodiment of the present invention, the glass filler consists of glass with a content of alkali oxides and alkaline earth oxides of 0 to 10% by weight, preferably 0 to 8% by weight, preferably 0 to 6% by weight, relative to the composition of the glass.

The glass filler is selected from the group consisting of fibres, ground fibres, particles, flakes, balls and mixtures hereof, preferably consisting of fibres, particles, flakes and mixtures thereof.

The glass filler can be surface-treated. This can take place with a suitable size- or adhesive system. For this purpose, for example systems based on fatty acids, waxes, silanes, titanates, polyamides, urethanes, polyhydroxyethers, epoxides, nickel, respectively combinations or mixtures thereof, can be used. Preferably, the glass filler is surface-treated with aminosilanes, epoxysilanes, polyamides or mixtures thereof.

If fibres are selected as glass filler for component (B), then the glass fibres are selected from the group consisting of cut fibres, endless fibres and mixtures thereof, the fibres having a cross-section which is round, oval, elliptical, square or rectangular.

The appearance of the glass fibres can be elongated or spiral. The cut glass fibres preferably have a fibre length of 1 to 25 mm, preferably 1.5 to 20 mm, particularly preferably 2 to 12 mm and very particularly preferably of 2 to 8 mm.

The cut glass fibres preferably have a diameter of 5 to 20 μm, preferably of 5 to 15 μm and particularly preferably of 6 to 12 μm.

If the glass fibres are used as endless fibres (rovings), they preferably have a diameter of at most 20 μm, preferably of at most 18 μm, particularly preferably of 5 to 14 μm.

In the case of flat glass fibres, the aspect ratio, i.e. the ratio of the main cross-sectional axis to the subsidiary cross-sectional axis, is 1.5 to 8, preferably 2 to 6, particularly preferably 3 to 5.

The cross-sectional axes of the flat glass fibres are 3 to 40 μm long. Preferably, the length of the subsidiary cross-sectional axis is 3 to 20 μm, particularly preferably 4 to 10 μm and the length of the main cross-sectional axis is 6 to 40 μm, particularly preferably 12 to 30 μm.

For reinforcing the polyamide moulding compounds according to the invention, also mixtures of fibres with a circular (round) and non-circular (flat) cross-section can be used.

If glass balls or glass particles are selected as glass filler (B), the average volumetric diameter ($d_{50}$) thereof is 0.3 to 100 μm, preferably 5 to 80 μm, particularly preferably 17 to 70 μm, measured by means of laser diffraction according to ASTM B 822-10 (2010).

Another preferred embodiment of the present invention provides that the polyamide moulding compound comprises at least one additive, in particular selected from the group consisting of inorganic and organic stabilisers, in particular antioxidants, antiozonants, light-protection means, UV stabilisers, UV absorbers or UV blockers, lubricants, mould-release agents, separating means, chain-lengthening additives, colourants, marking means, inorganic pigments, organic pigments, IR absorbers, NIR absorbers, photochromic agents, mould-release agents, optical brighteners, polytetrafluoroethylene, halogen-free flame retardants, natural layer silicates, synthetic layer silicates, fillers with a relative permittivity of at most 3.5, e.g. chalk or talc, nanoscale fillers with an average particle size of at most 100 nm, preferably determined by means of laser measurement according to ISO 13320.

According to another preferred embodiment of the present invention, the moulding compound has a weld line strength, determined according to EN ISO 178 (2010), of at least 200 MPa and preferably of at least 250 MPa.

According to a further preferred embodiment of the present invention, component (A) consists only of components Aa) and Ab).

A further preferred embodiment of the present invention provides that the polyamide moulding compound consists only of components (A), (B) and (C).

Moulded Articles

The present invention relates furthermore to moulded articles which comprise the polyamide moulding compound according to the invention and which consist preferably of this polyamide moulding compound.

According to a preferred embodiment of the present invention, the moulded articles concern components, housings or housing parts of devices which communicate with electromagnetic waves at a frequency of 0.3 to 300 GHz, i.e. with wavelengths of 1 m to 1 mm.

A further preferred embodiment of the present invention provides that the moulded article is selected from the group consisting of components, housings or housing parts of transmitting- and receiving devices, mobile phones, tablets, laptops, navigation devices, monitoring cameras, photographic cameras, sensors, diving computers, audio units, remote controls, loudspeakers, headphones, radio sets, television sets, household appliances, kitchen appliances, door- or gate openers, operating devices for the central locking in vehicles, keyless-go vehicle keys, temperature measuring- or temperature display devices, measuring devices and control devices.

The subject according to the invention is intended to be explained in more detail with reference to the subsequent examples without wishing to restrict said subject to the specific embodiments shown here.

1 Measuring Methods

Within the scope of this application, the following measuring methods were used:

Relative Viscosity

The relative viscosity was determined according to ISO 307 (2007) at 20° C. For this purpose, 0.5 g polymer granulate was weighed into 100 ml m-cresol, calculation of the relative viscosity (RV) according to $RV=t/t_0$ was effected following section 11 of the standard.

Glass Transition Temperature (Tg) and Melting Point

Determination of the glass transition temperature and of the melting point was effected according to ISO 11357-2 and -3 (2013) on granulate. Differential Scanning Calorimetry (DSC) was implemented during each of the two heatings at a heating rate of 20 K/min. After the first heating, the sample was quenched in dry ice. Glass transition temperature (Tg) and melting point were determined during the second heating.

The temperature at peak maximum was indicated as melting point. The average of the glass transition range which was indicated as glass transition temperature (Tg) was determined according to the "half height" method.

Modulus of Elasticity in Tension

Determination of the modulus of elasticity in tension was implemented according to ISO 527 (2012) at 23° C. with a tensile speed of 1 mm/min on an ISO tension bar (type A1, mass 170×20/10×4 mm), produced according to the standard: ISO/CD 3167 (2003).

Tearing Strength and Breaking Elongation

Determination of tearing strength and breaking elongation were implemented according to ISO 527 (2012) at 23° C. with a tensile speed of 5 mm/min with reinforced materials on an ISO tension bar, type A1 (mass 170×20/10×4 mm), produced according to the standard ISO/CD 3167 (2003).

Impact Strength According to Charpy

Determination of the impact strength according to Charpy was implemented according to ISO 179/2*eU (1997, * 2=instrumented) at 23° C. on an ISO test bar, type B1 (mass 80×10×4 mm), produced according to the standard ISO/CD 3167 (2003).

Notch Impact Strength According to Charpy

Determination of the notch impact strength according to Charpy was implemented according to ISO 179/2*eA (1997, * 2=instrumented) at 23° C. on an ISO test bar, type B1 (mass 80×10×4 mm), produced according to the standard ISO/CD 3167 (2003).

Weld Line Strength

Figure 1:
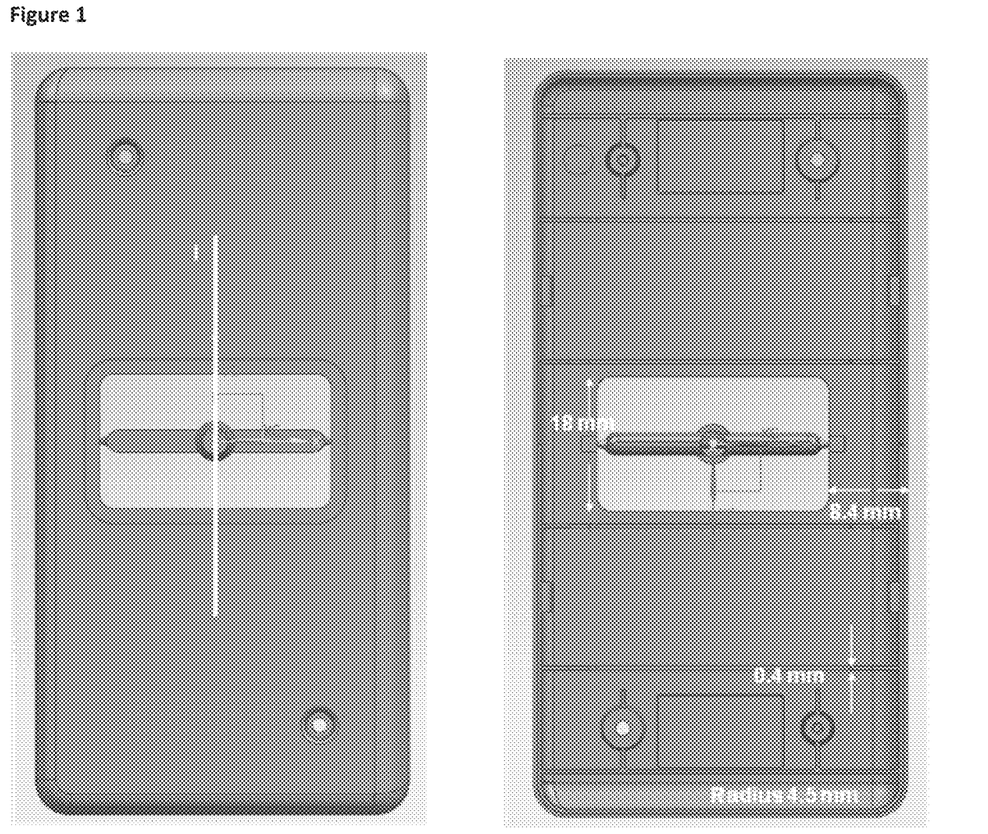
FIG. 1 depicts an embodiment of a component of a device made with a polyamide moulding compound in accordance with an embodiment of the invention.

The weld line strength was determined via a bending test according to EN ISO 178 (2010) on 2 assembled mobile phone half-shells (99.7×49.7×7.1 mm) as test piece with a Zwick TC-FR010TH.A50 test machine with a pressure fin (radius of the pressure fin=5 mm) at a test speed of 100 mm/min. The position of the pressure fin on the mobile phone half-shell can be deduced from the left-hand side of FIG. 1 (reference number I), the further measurements of the mobile phone half-shells emerge from the right-hand side of FIG. 1. The arithmetic average of the measurements on 5 test pieces is indicated.

Relative Permittivity

Measurement of the relative permittivity $\varepsilon_r$ is effected according to IEC 61189-2-721 (2015) on 80×80×3 mm plates with a poured film with a Split Post Dielectric Resonator (SPDR) of the company QWED, Poland (brochure, including information relating to measurement obtainable under www.qwed.eu). The measuring frequency is 2.45 GHz, the measuring temperature 23° C.

Mould Shrinkage

Production of the plates (type D2, 60×60×2 mm, poured film) for determining the mould shrinkage was effected according to ISO 294-3 (2002) and Amendment 1 (2006). The mould shrinkage was determined according to ISO 294-4 (2001) after storage of the plates for 14 days in room conditions (23° C., 50% relative humidity) with respect to the mould cavity size and in fact longitudinally and transversely relative to the flow direction of the moulding compound melt. The arithmetic average of the measurements on 5 plates is indicated. The difference of the mould shrinkage longitudinally and transversely relative to the flow direction of the moulding compound melt is subsequently also termed distortion.

Colouring Test

With a felt tip pen of the make Zebra, type MO-120-MC (black), 5 equidistant lines, parallel or perpendicular to the poured film or a painted square with 2 cm side length, are applied on plates (type D1, 60×60×1 mm, poured film, according to ISO 294-3 (2002) and Amendment 1 (2006)). The painted plates are subsequently stored for 1 h in the air-conditioned cabinet at 70° C. and 65% relative humidity, removed from the air-conditioned cabinet and thereafter cooled at room temperature for 1 h in the laboratory. Then the marking is wiped over, ten times, with a paper tissue saturated once with ethanol. The result is evaluated with 1 to 5: 1=marking completely removed, 5=marking unchanged.

Glass Fibre Composition

The composition of the glass fibres was determined by energy-dissipative X-ray fluorescence spectroscopy (ED-XRF). As equipment, a spectrometer of the type Spectro XEPOS He of SPECTRO Analytical Instruments GmbH was used. The glass fibres were placed in a polypropylene (PP) cuvette, the bottom of which consists of a PP film. The X-ray source has a power of 50 W and operates up to 60 kV. The following targets were used for determining the individual elements: Compton/secondary molybdenum, Barkla scatterer corundum, secondary target cobalt and secondary target palladium. The measuring time was respectively 180 s.

2 Starting Materials

The materials used in the examples and comparative examples are compiled in tables 1a and 1b and 2.

TABLE 1a

Materials used in the examples and comparative examples.

| Components | Description | Manufacturer |
|---|---|---|
| Polyamide (Aa1) | Polyamide 12 made of laurinlactam<br>RV*: 1.90 (measured with 0.5 g in 100 ml m-cresol at 20° C.)<br>C atoms per amide group 11.0<br>Melting point 178° C. | EMS-CHEMIE AG, Switzerland |
| Polyamide (Aa2) | Polyamide 610 made of 1,6-hexanediamine and 1,10-decanedioic acid<br>C atoms per amide group 7.0<br>RV* 1.95 (measured with 0.5 g in 100 ml m-cresol at 20° C.)<br>Melting point 223° C. | EMS-CHEMIE AG, Switzerland |
| Polyamide (Aa3) | Polyamide 6 made of ε-caprolactam<br>C atoms per amide group 5.0<br>RV 1.83 (measured with 0.5 g in 100 ml m-cresol at 20° C.)<br>Melting point 222° C. | EMS-CHEMIE AG, Switzerland |
| Polyamide (Aa4) | Polyamide 66 made of 1,6-hexanediamine and 1,6-hexanedioic acid<br>C atoms per amide group 5.0<br>RV* 1.82 (measured with 0.5 g in 100 ml m-cresol at 20° C.)<br>Melting point 262° C.<br>Trade name: Radipol A45 | RadiciGroup Performance Plastics, Italy |
| Polyamide (Aa5) | Polyamide 46 made of 1,4-butanediamine and 1,6-hexanedioic acid<br>C atoms per amide group 4.0<br>RV* 2.00 (measured with 0.5 g in 100 ml m-cresol at 20° C.)<br>Melting point 286° C.<br>Trade name: Stanyl TE 300 | EMS-CHEMIE AG, Switzerland |

*RV relative viscosity, measured on a solution of 0.5 g polyamide in 100 ml m-cresol at 20° C.

TABLE 1b

Materials used in the examples and comparative examples.

| Components | Description | Manufacturer |
|---|---|---|
| Polyamide (Aa6) | Polyamide 616 made of 1,6-hexanediamine and 1,16-hexadecanedioic acid<br>C atoms per amide group 10.0<br>RV* 1.95 (measured with 0.5 g in 100 ml m-cresol at 20° C.)<br>Melting point 195° C. | EMS-CHEMIE AG, Switzerland |
| Polyamide (Aa7) | Polyamide 1016 made of 1,10-decanediamine and 1,16-hexadecanedioic<br>C atoms per amide group 12.0<br>RV* 1.75 (measured with 0.5 g in 100 ml m-cresol at 20° C.)<br>Melting point 180° C. | EMS-CHEMIE AG, Switzerland |
| Polyamide (Aa8) | Polyamide 612 made of 1,6-hexanediamine and 1,12-dodecanedioic acid<br>C atoms per amide group 8.0<br>RV* 1.80 (measured with 0.5 g in 100 ml m-cresol at 20° C.)<br>Melting point 215° C. | EMS-CHEMIE AG, Switzerland |
| Polyamide (Ab1) | Amorphous polyamide MACM12 made of bis(3-methyl-4-aminocyclohexyl)methane and 1,12-dodecanedioic acid<br>C atoms per amide group 12.5<br>RV*: 1.53 (measured with 0.5 g in 100 ml m-cresol at 20° C.)<br>Glass transition temperature 155° C. | EMS-CHEMIE AG, Switzerland |
| Polyamide (Ab2) | Amorphous polyamide MACMI/MACMT/12 in the molar ratio 38/38/24 made of bis(3-methyl-4-aminocyclohexyl)methane, isophthalic acid, terephthalic acid and laurinlactam | EMS-CHEMIE AG, Switzerland |

TABLE 1b-continued

Materials used in the examples and comparative examples.

| Components | Description | Manufacturer |
|---|---|---|
| | C atoms per amide group 9.3<br>RV 1.53 (measured with 0.5 g in 100 ml m-cresol at 20° C.)<br>Glass transition temperature 194° C. | |
| Polyamide (Ab3) | Amorphous polyamide 6I/6T made of hexamethylenediamine, isophthalic acid and terephthalic acid<br>Molar ratio isophthalic acid:terephthalic acid 2:1<br>C atoms per amide group 6.0<br>RV* 1.54 (measured with 0.5 g in 100 ml m-cresol at 20° C.)<br>Glass transition temperature 125° C. | EMS-CHEMIE AG, Switzerland |

*RV relative viscosity, measured on a solution of 0.5 g polyamide in 100 ml m-cresol at 20° C.

TABLE 2

Materials used in the examples and comparative examples.

| Components | Description | Manufacturer |
|---|---|---|
| Glass fibre (B1) | Round glass fibre, 3 mm long<br>Diameter 13 μm,<br>Content of alkali- and alkaline earth oxides 5.8% by wt.<br>Trade name: CPIC CS (HL) 301HP-3 | Chongqing Polycomp International Corp., China |
| Glass fibre (B2) | Flat glass fibre, 3 mm long,<br>Main cross-sectional axis 28 μm,<br>Subsidiary cross-sectional axis 7 μm,<br>Aspect ratio of the cross-sectional axes = 4,<br>Content of alkali- and alkaline earth oxides 20.2% by wt.<br>Trade name: Nittobo CSG3PA-820 | Nitto Boseki Co., LTD., Japan |
| Glass fibre (B3) | Round glass fibre, 3 mm long<br>Diameter 6 μm,<br>Content of alkali- and alkaline earth oxides 15.4% by wt.<br>Trade name: Micromax 771 6 μm | European Owens Corning Fiberglas SPRL, Belgium |
| Glass fibre (B4) | Round glass fibre, 3 mm long<br>Diameter 10 μm,<br>Content of alkali- and alkaline earth oxides 20.2% by wt.<br>Trade name: CPIC ECS 301HP | Chongqing Polycomp International Corp., China |
| Glass fibre (B5) | Round glass fibre, 4 mm long<br>Diameter 9 μm,<br>Content of alkali- and alkaline earth oxides 7.6% by wt.<br>Trade name: AGY SG37 553 5-32" | AGY - Europe, France |
| Nucleation agent (C1) | Condensation product of oxalic acid with ethylenediamine<br>Trade name: Brüggolen P22 | Brüggemann Chemical, L. Brüggemann KG, Germany |
| Heat stabiliser (C2) | bis[3,3-bis(4'hydroxy-3'-tert-butylphenyl)butanoic acid glycol ester<br>CAS no. 32509-66-3<br>Trade name: Hostanox O 3 P | Clariant Produkte (Switzerland) AG, Switzerland |
| Heat stabiliser (C3) | tetrakis(2,4-di-tert-butylphenyl)-4,4'-biphenyldiphosphonite<br>CAS no. 119345-01-6<br>Trade name: Hostanox P-EPQ | Clariant Produkte (Switzerland) AG, Switzerland |
| UV stabiliser (C4) | 2-(2H-benzotriazol-2-yl)-4,6-bis(1-methyl-1-phenylethyl)phenol<br>CAS no. 70321-86-7<br>Trade name: Tinuvin 234 | BASF Switzerland AG, Switzerland |
| Multifunctional stabiliser (C5) | N,N'-bis(2,2,6,6,tetramethyl-4-piperidinyl)-1,3-benzenedicarboxamide<br>CAS no. 42774-15-2<br>Trade name: Nylostab S-EED P | Clariant Produkte (Switzerland) AG, Switzerland |
| Stabiliser packet (C6) | Mixture of stabilisers (C2) to (C5) in the weight ratio<br>C2:C3:C4:C5 = 2.5:1:1.5:1 | — |

3.1 Production of the PA Moulding Compounds

For production of the polyamide moulding compounds according to the invention, components (A) and (B) and possibly (C) are mixed on normal compounding machines, such as e.g. single or twin-screw extruders or screw kneaders. The components are thereby metered individually via gravimetric metering scales into the feed or respectively into a side feeder or supplied in the form of a dry blend. Component (B) (glass filler) is metered preferably via a side feeder into the polymer melt.

If additives (component C) are used, these can be introduced directly or in the form of a master batch. The carrier material of the master batch preferably concerns a polyamide or a polyolefin. Amongst the polyamides, particularly the polyamide of the respective components Aa), PA 11, PA 12, PA 612, PA 1010 or PA 1212 are suitable for this purpose.

For the dry blend production, the dried granulate of component (A) and possibly component (C) are mixed in a closed container. This mixture is homogenised by means of a tumble mixer, eccentric mixer or tumble dryer for 10 to 40 minutes. In order to avoid moisture absorption, this can be effected under dried protective gas.

The compounding is effected at set cylinder temperatures of 250 to 320° C., the temperature of the first cylinder being able to be set below 110° C. A vacuum can be applied in front of the nozzle or degassing can take place atmospherically. The melt can be discharged in strand form, cooled in the water bath at 10 to 80° C. and subsequently granulated. The granulate is dried at 80 to 120° C. under nitrogen or in a vacuum to a water content of below 0.1% by weight. Granulation can likewise be implemented by underwater granulation.

Processing of the polyamide moulding compounds according to the invention by injection moulding is effected with cylinder temperatures of 250 to 320° C., a temperature profile which increases and decreases from the feed towards the nozzle being able to be used. The mould temperature is set to a temperature of 40 to 140° C., preferably 60 to 80° C.

3.2 Production of the Polyamide Moulding Compound According to Example 1

The dried granulates of polyamides (Aa1) and (Ab1) were mixed together with the additives (C1) and (C6) to form a dry blend and in fact in the ratio indicated in table 3. This mixture was homogenised by means of a tumble mixer for approx. 20 minutes.

The polyamide moulding compound was produced on a twin-screw extruder of the company Werner & Pfleiderer, type ZSK 25 in the ratio indicated in table 3. The dry blend was thereby metered into the feed via metering scales. The glass fibres (B1) were metered into a side feeder via metering scales, which side feeder conveyed the glass fibres (B1) into the melt six housing units in front of the nozzle.

The temperature of the first housing was set to 70° C., that of the remaining housings to 260 to 280° C. A speed of rotation of 250 rpm and a throughput of 15 kg/h was used and atmospheric degassing took place. The strands were cooled in a water bath, cut and the obtained granulate was dried at 110° C. for 24 h in a vacuum (30 mbar) to a water content below 0.1% by weight.

3.3 Production of the Test Pieces

The test pieces were produced on an injection moulding machine of the company Arburg, Modell Allrounder 420 C 1000-250. Cylinder temperatures rising from 250° C. to 290° C. were thereby used. The mould temperature was 60° C.

The test pieces, provided nothing else is indicated, were used in the dry state; for this purpose, they were stored after injection moulding for at least 48 h at room temperature in a dry environment, i.e. over silica gel.

3.4 Results

The following table 3 and also tables 6 and 7 (in part) relate to examples according to the present invention and tables 4 and 5 and also 6 and 7 (in part) show comparative examples.

For components (A), (B) and (C), respectively quantity data were given in percent by weight in the tables. In tables 3 to 5, there should be understood by the entry "C atoms per amide group", the average number of C atoms, not involved in the amide group, per amide group in the mixture.

TABLE 3

| | | Examples. | | | | |
|---|---|---|---|---|---|---|
| | | Examples | | | | |
| Components | Unit | 1 | 2 | 3 | 4 | 5 |
| Polyamide (Aa1) | % by wt. | 36.975 | 33.225 | 29.475 | 36.975 | — |
| Polyamide (Ab1) | % by wt. | 12.325 | 11.075 | 9.825 | — | — |
| Polyamide (Ab2) | % by wt. | — | — | — | 12.325 | — |
| Polyamide (Aa2) | % by wt. | — | — | — | — | 36.975 |
| Polyamide (Ab3) | % by wt. | — | — | — | — | 12.325 |
| Polyamide (Aa6) | % by wt. | — | — | — | — | — |
| Polyamide (Aa7) | % by wt. | — | — | — | — | — |
| Polyamide (Aa8) | % by wt. | — | — | — | — | — |
| C atoms per amide group | — | 11.4 | 11.4 | 11.4 | 10.6 | 6.8 |
| Glass fibre (B1) | % by wt. | 50 | 55 | 60 | 50 | 50 |
| Glass fibre (B5) | | — | — | — | — | — |
| Nucleation agent (C1) | % by wt. | 0.1 | 0.1 | 0.1 | 0.1 | 0.1 |
| Stabiliser packet (C6) | % by wt. | 0.6 | 0.6 | 0.6 | 0.6 | 0.6 |
| Tests | | | | | | |
| Relative permittivity ($\varepsilon_r$) at 2.45 GHz | — | 3.24 | 3.35 | 3.42 | 3.27 | 3.47 |
| Linear mould shrinkage, longitudinally, 24 h (SSWl) | % | −0.01 | −0.01 | −0.01 | 0.01 | 0.26 |
| Linear mould shrinkage, transversely, 24 h (SSWq) | % | 0.30 | 0.29 | 0.25 | 0.27 | 0.29 |
| Distortion[a)] | % | 0.31 | 0.30 | 0.26 | 0.26 | 0.03 |

TABLE 3-continued

|  |  | Examples. | | | | |
|---|---|---|---|---|---|---|
| Linear mould shrinkage, longitudinally, 14 d (SSWl) | % | −0.01 | −0.02 | −0.01 | −0.03 | 0.26 |
| Linear mould shrinkage, transversely, 14 14 d (SSWl) | % | 0.30 | 0.29 | 0.26 | 0.26 | 0.49 |
| Distortion[a)] | % | 0.31 | 0.31 | 0.27 | 0.29 | 0.13 |
| Modulus of elasticity in tension | MPa | 12,100 | 13,900 | 15,600 | 12,100 | 14,250 |
| Tearing strength | MPa | 148 | 148 | 150 | 166 | 191 |
| Breaking elongation | % | 4.3 | 3.7 | 3.1 | 2.9 | 3.7 |
| Impact strength, Charpy, 23° C. | kJ/m$^2$ | 82 | 80 | 73 | 80 | 99 |

|  |  | Examples | | | |
|---|---|---|---|---|---|
| | Components | 6 | 7 | 8 | 9 |
| | Polyamide (Aa1) | — | — | — | — |
| | Polyamide (Ab1) | — | — | — | — |
| | Polyamide (Ab2) | — | — | — | — |
| | Polyamide (Aa2) | — | — | — | — |
| | Polyamide (Ab3) | 16.075 | 16.075 | 16.075 | 16.075 |
| | Polyamide (Aa6) | 48.225 | 38.225 | — | — |
| | Polyamide (Aa7) | — | — | 48.225 | — |
| | Polyamide (Aa8) | — | — | — | 48.225 |
| | C atoms per amide group | 9.0 | 8.8 | 10.5 | 7.5 |
| | Glass fibre (B1) | — | 45 | — | — |
| | Glass fibre (B5) | 35 | — | 35 | 35 |
| | Nucleation agent (C1) | 0.1 | 0.1 | 0.1 | 0.1 |
| | Stabiliser packet (C6) | 0.6 | 0.6 | 0.6 | 0.6 |
| | Tests | | | | |
| | Relative permittivity ($\varepsilon_r$) at 2.45 GHz | 3.27 | 3.34 | 3.22 | 3.30 |
| | Linear mould shrinkage, longitudinally, 24 h (SSWl) | 0.03 | 0.02 | 0.03 | 0.02 |
| | Linear mould shrinkage, transversely, 24 h (SSWq) | 0.30 | 0.32 | 0.29 | 0.31 |
| | Distortion[a)] | 0.27 | 0.30 | 0.26 | 0.29 |
| | Linear mould shrinkage, longitudinally, 14 d (SSWl) | 0.02 | 0.01 | 0.02 | 0.01 |
| | Linear mould shrinkage, transversely, 14 14 d (SSWl) | 0.29 | 0.31 | 0.28 | .030 |
| | Distortion[a)] | 0.27 | 0.30 | 0.26 | 0.29 |
| | Modulus of elasticity in tension | 11,080 | 11,700 | 10,400 | 11,600 |
| | Tearing strength | 182 | 175 | 170 | 218 |
| | Breaking elongation | 4.6 | 3.9 | 4.3 | 3.8 |
| | Impact strength, Charpy, 23° C. | 106 | 77 | 101 | 100 |

[a)] The distortion corresponds to the difference of SSWq and SSWl.

TABLE 4

| | | Comparative examples | | | | |
|---|---|---|---|---|---|---|
| | | Comparative examples | | | | |
| Components | Unit | 10 | 11 | 12 | 13 | 14 |
| Polyamide (Aa1) | % by wt. | 36.975 | 35.475 | 33.225 | 33.225 | 25.725 |
| Polyamide (Ab1) | % by wt. | 12.325 | 11.825 | 11.075 | 11.075 | 8.575 |
| C atoms per amide group | — | 11.4 | 11.4 | 11.4 | 11.4 | 11.4 |
| Glass fibre (B2) | % by wt. | 50 | 52 | 55 | — | 55 |
| Glass fibre (B3) | % by wt. | — | — | — | 55 | — |
| PTFE powder CF 905 FN | % by wt. | — | — | — | — | 10 |
| Nucleation agent (C1) | % by wt. | 0.1 | 0.1 | 0.1 | 0.1 | 0.1 |
| Stabiliser packet (C6) | % by wt. | 0.6 | 0.6 | 0.6 | 0.6 | 0.6 |

TABLE 4-continued

| | | Comparative examples | | | | |
|---|---|---|---|---|---|---|
| | | Comparative examples | | | | |
| Components | Unit | 10 | 11 | 12 | 13 | 14 |
| Tests | | | | | | |
| Relative permittivity ($\varepsilon_r$) at 2.45 GHz | — | 3.73 | 3.73 | 3.84 | 3.83 | 3.93 |
| Linear mould shrinkage, longitudinally, 14 d (SSWl) | % | −0.11 | 0.01 | −0.10 | −0.08 | −0.03 |
| Linear mould shrinkage, tranversely, 14 d (SSWq) | % | 0.13 | 0.16 | 0.11 | 0.22 | 0.11 |
| Distortion[a] | % | 0.24 | 0.17 | 0.21 | 0.30 | 0.14 |
| Modulus of elasticity in tension | MPa | 14,100 | 14,400 | 16,000 | 16,500 | 16,650 |
| Tearing strength | MPa | 172 | 172 | 179 | 171 | 157 |
| Breaking elongation | % | 3.1 | 3.1 | 2.8 | 3.9 | 2.9 |
| Impact strength, Charpy, 23° C. | kJ/m$^2$ | 86 | 88 | 85 | 86 | 83 |
| Notch impact strength, Charpy, 23° C. | kJ/m$^2$ | 24 | 26 | 25 | 19 | 22 |

[a] The distortion corresponds to the difference of SSWq and SSWl.

TABLE 5

| | | Comparative examples | | | | | | |
|---|---|---|---|---|---|---|---|---|
| | | Comparative examples | | | | | | |
| Components | Unit | 15 | 16 | 17 | 18 | 19 | 20 | 21 |
| Polyamide (Aa1) | % by wt. | 36.975 | 29.475 | 25.725 | — | — | — | — |
| Polyamide (Ab1) | % by wt. | 12.325 | 9.825 | 8.525 | — | — | — | — |
| Polyamide (Ab3) | % by wt. | — | — | — | — | — | 12.325 | — |
| Polyamide (Aa3) | % by wt. | — | — | — | 49.3 | — | — | — |
| Polyamide (Aa4) | % by wt. | — | — | — | — | 49.3 | 36.975 | — |
| Polyamide (Aa5) | % by wt. | — | — | — | — | — | — | 49.3 |
| C atoms per amide group | — | 11.4 | 11.4 | 11.4 | 5.0 | 5.0 | 5.3 | 4.0 |
| Glass fibre (B1) | % by wt. | — | — | — | 50 | 50 | 50 | 50 |
| Glass fibre (B4) | % by wt. | 50 | 60 | 65 | — | — | — | — |
| Nucleation agent (C1) | % by wt. | 0.1 | 0.1 | 0.1 | 0.1 | 0.1 | 0.1 | 0.1 |
| Stabiliser packet (C6) | % by wt. | 0.6 | 0.6 | 0.6 | 0.6 | 0.6 | 0.6 | 0.6 |
| Tests | | | | | | | | |
| Relative permittivity ($\varepsilon_r$) at 2.45 GHz | — | 3.67 | 3.99 | 4.21 | 3.64 | 3.57 | 3.69 | 3.70 |
| Linear mould shrinkage, longitudinally, 14 d (SSWl) | % | −0.03 | −0.04 | −0.04 | 0.29 | 0.34 | 0.09 | 0.24 |
| Linear mould shrinkage, tranversely, 14 d (SSWq) | % | 0.21 | 0.18 | 0.17 | 0.59 | 1.02 | 0.76 | 1.03 |
| Distortion [a] | % | 0.24 | 0.22 | 0.21 | 0.30 | 0.68 | 0.67 | 0.79 |
| Modulus of elasticity in tension | MPa | 12,950 | 16,650 | 19,400 | 15,000 | 14,500 | 14,900 | 14,400 |
| Tearing strength | MPa | 166 | 178 | 183 | 197 | 195 | 208 | 209 |
| Breaking elongation | % | 2.9 | 2.3 | 2.0 | 3.6 | 3.1 | 3.1 | 2.7 |
| Impact strength, Charpy, 23° C. | kJ/m$^2$ | 80 | 77 | 67 | 76 | 90 | 100 | 51 |
| Notch impact strength, Charpy, 23° C. | kJ/m$^2$ | 25 | 24 | 23 | 15 | 14 | 14 | 11 |

[a] The distortion corresponds to the difference of SSWq and SSWl

TABLE 6

Colouring test on 60 × 60 × 1 mm plates with poured film.

| | Unit | Example 22 | Comparative example 23 |
|---|---|---|---|
| Components | | | |
| Polyamide (Aa1) | % by wt. | 36.975 | 10.0 |
| Polyamide (Ab1) | % by wt. | — | 39.3 |
| Polyamide (Ab2) | % by wt. | 12.325 | — |
| Glass fibre (B1) | % by wt. | 50 | 50 |
| Nucleation agent (C1) | % by wt. | 0.1 | 0.1 |
| Stabiliser packet (C6) | % by wt. | 0.6 | 0.6 |
| Test* | | | |
| Pen: ZEBRA, MO-120-MC (black) | | | |
| 5 lines, equidistant, parallel to the film gate | — | 2 | 4-5 |
| 5 lines, equidistant, perpendicular to the film gate | — | 2 | — |
| Square, painted, 2 cm side length, centre of the plate | — | 2 | — |

*Assessment 1 to 5,
1 = Marking completely removed
5 = Marking unchanged

TABLE 7

Test for weld line strength on two assembled mobile phone half-shells.

| | Unit | Examples 24 | Examples 25 | Comparative example 26 |
|---|---|---|---|---|
| Components | | | | |
| Polyamide (Aa1) | % by wt. | 36.975 | 33.225 | 10.0 |
| Polyamide (Ab1) | % by wt. | 12.325 | 11.075 | 39.3 |
| Glass fibre (B1) | % by wt. | 50 | 55 | 50 |
| Nucleation agent (C1) | % by wt. | 0.1 | 0.1 | 0.1 |
| Stabiliser packet (C6) | % by wt. | 0.6 | 0.6 | 0.6 |
| Test | | | | |
| Weld line strength at 100 mm/min | MPa | 310 | 289 | 136 |

4 Discussion of the Results

It can be deduced from table 3 that the polyamide moulding compounds according to examples 1 to 9, which comprise glass fillers according to the present invention with a content of alkali oxides and alkaline earth oxides of 5.8% by weight or 7.6% by weight, have a relative permittivity at 2.45 GHz of 3.22 to 3.47. The polyamide moulding compounds described in table 4, according to comparative examples 10 to 14, comprise, in contrast, glass fillers with a higher content of alkali oxides and alkaline earth oxides (20.2% by weight or 15.4% by weight) and have significantly higher relative permittivities at 2.45 GHz of 3.73 to 3.93. The same applies for the comparative examples 15 to 17 of table 5 which have a glass filler with a content of alkali oxides and alkaline earth oxides of 20.2% by weight and have relative permittivities of 3.67 to 4.21. On the basis of the otherwise identical composition, for example example 1 is directly comparable with comparative examples 10 and 15 (relative permittivity of 3.24 for example 1 as opposed to 3.73 for CE6 and 3.67 for CE11) or example 2 with comparative example 12 (relative permittivity of 3.35 for example 2 as opposed to 3.84 for CE12).

Furthermore, comparative examples 18, 19 and 21 show that the combination of a partially crystalline aliphatic polyamide (component Aa)) solely with a glass filler according to the invention also leads to high permittivities of 3.64 or 3.67. From comparison with the examples according to the invention (e.g. comparison with example 1 with in total likewise 49.3% by weight of polyamide, as in CE18 or CE19), it must be concluded that it is essential, for achieving low permittivities, to use a blend of a partially crystalline aliphatic (component Aa)) and an amorphous or microcrystalline polyamide (component Ab)). In CE20, a blend of a partially crystalline aliphatic (component Aa)) and an amorphous polyamide (component Ab)) are present in combination with a glass fibre according to the invention. Nevertheless, the permittivity of this polyamide moulding compound is relatively high at 3.69. It can be deduced therefrom that also the blend ratio and the resulting average number of C atoms, not involved in the amide group, per amide group in the mixture (for CE20 only 5.3) is essential in order to achieve low relative permittivity.

Figure 2:
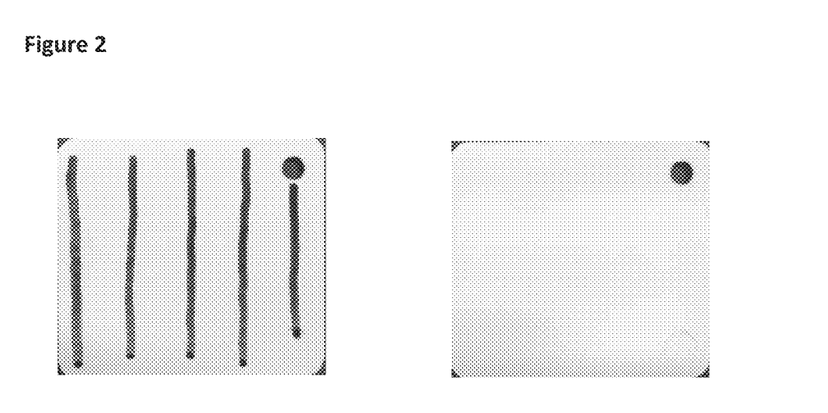
FIG. 2 depicts the colouring test according to example 22 (the composition of which is identical to the polyamide moulding compound according to the invention of example 4).
Figure 3:
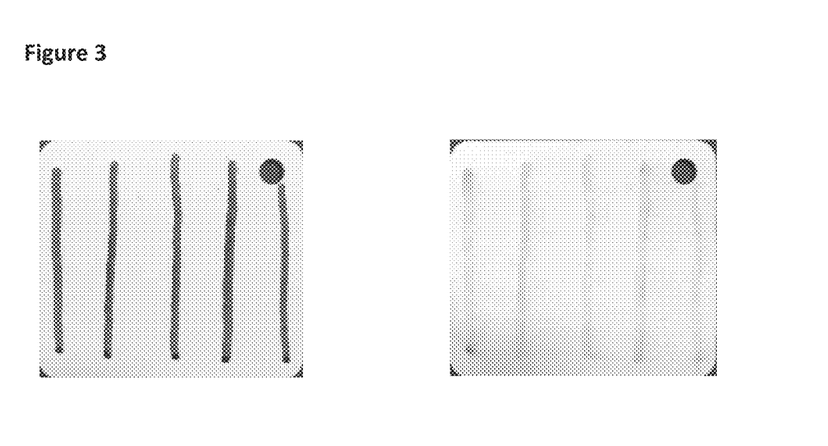
FIG. 3 depicts the colouring test according to comparative example 23.

In emerges from table 6 that the polyamide moulding compounds according to the present invention also display improved dirt-repellent behaviour. FIG. 2 shows the colouring test according to example 22 (the composition of which is identical to the polyamide moulding compound according to the invention of example 4) and FIG. 3 shows the colouring test according to comparative example 23. The left-hand side of both Figures shows respectively a plate before the treatment with ethanol, described under point 1, the right-hand side of the Figures shows the plates after the ethanol treatment is completed. The dirt-repellent behaviour of the plates made of the polyamide moulding compounds according to the invention with a deficit of component Ab) is significantly better than that of the polyamide moulding compound of comparative example 23 with an excess of component Ab).

Furthermore, it can be deduced from table 7 that the weld line strength of moulded articles made of the polyamide moulding compounds according to the invention of example 24 and example 25 (the composition of which is identical to those of the polyamide moulding compounds according to the invention of examples 1 and 2) at 310 MPa or 289 MPa is significantly higher than that made of a polyamide moulding compound which has a ratio of polyamides Aa) and Ab), not according to the invention, in the mixture (A), namely an excess of component Ab). The weld line strength of the polyamide moulding compound of comparative example 26 is only at 136 MPa.

In summary, it can be established that polyamide moulding compounds which have a low relative permittivity of <3.5, good dirt-repellent behaviour and also good mechanical properties, in particular good weld line strength, are only obtained via the special feature combination found by the inventors.

The invention claimed is:

1. A polyamide moulding compound comprising the following components:
    (A) 25 to 80% by weight of a mixture made of
        (Aa) 50.1 to 90% by weight of one partially crystalline aliphatic polyamide selected from the group consisting of PA 10, PA 11, PA 12, and PA 516 and
        (Ab) 10 to 49.9% by weight of at least one amorphous or microcrystalline polyamide selected from the group consisting of PA 6I/6T, PA MACM9, PA MACM10, PA MACM12, PA MACM13, PA MACM14, PA MACM16, PA MACM17, PA MACM18, PA PACM10, PA PACM12, PA PACM13, PA PACM14, PA PACM16, PA PACM17, PA PACM18, PA TMDC10, PA TMDC12, PA TMDC13, PA TMDC14, PA TMDC16, PA TMDC17, PA TMDC18, PA MACM10/10, PA PACM12/12, PA MACMT/12, PA 6I/MACMI/MACMT, PA MACMI/MACMT/12, PA MACMI/MACMT/MACM12, PA MACMI/MACMT/MACM12/12, PA 6I/6T/MACMI/MACMT/12, PA 6I/6T/MACMI, PA MACMI/MACM36, PA MACMT/MACM36, PA MACMI/MACM12, PA MACMT/MACM12, PA MACM6/11, PA MACM12/PACM12, PA MACM14/PACM14, PA MACM18/PACM18 and mixtures thereof, the proportions of components (Aa) and (Ab) adding up to 100% by weight and the mixture of components (Aa) and (Ab) having, on average, at least 5.7 C atoms, not involved in the amide group, per amide group in the mixture (A);

(B) 20 to 65% by weight of at least one glass filler, consisting of glass with a content of alkali oxides and alkaline earth oxides of 0 to 12% by weight, relative to the composition of the glass, selected from the group consisting of fibres, ground fibres, particles, flakes, balls and mixtures thereof; and (C) 0 to 10% by weight of additives;

the sum of components (A), (B) and (C) producing 100% by weight and the polyamide moulding compound having a relative permittivity of no more than 3.5 at 2.45 GHz.

2. The polyamide moulding compound according to claim 1, which has a distortion, as determined according to ISO 294-3 (2002), of no more than 0.5%.

3. The polyamide moulding compound according to claim 1, wherein the mixture of components (Aa) and (Ab) has at least 6.5 C atoms, not involved in the amide group, per amide group in the mixture.

4. The polyamide moulding compound according to claim 1, wherein the one partially crystalline, aliphatic polyamide (Aa) is selected from the group consisting of PA 10, PA 11, and PA 12.

5. The polyamide moulding compound according to claim 1, wherein the at least one amorphous or microcrystalline polyamide (Ab) has a glass transition temperature of at least 120° C.

6. The polyamide moulding compound according to claim 1, wherein the proportion of partially crystalline polyamide (Aa) of component (A) is 60 to 85% by weight.

7. The polyamide moulding compound according to claim 1, wherein the proportion of amorphous or microcrystalline polyamide (Ab) of component (A) is 15 to 40% by weight.

8. The polyamide moulding compound according to claim 1, wherein the proportion of component (A) in the polyamide moulding compound is 34.9 to 69.9% by weight, relative to the total weight of the polyamide moulding compound, and/or the proportion of component (B) in the polyamide moulding compound is 30 to 65% by weight, relative to the total weight of the polyamide moulding compound, and/or the proportion of component (C) in the polyamide moulding compound is 0.1 to 8% by weight, relative to the total weight of the polyamide moulding compound.

9. The polyamide moulding compound according to claim 1, wherein the glass filler consists of glass with a content of alkali oxides and alkaline earth oxides of 0 to 10% by weight, relative to the composition of the glass.

10. The polyamide moulding compound according to claim 1, wherein the polyamide moulding compound comprises at least one additive, selected from the group consisting of inorganic and organic stabilisers, antioxidants, antiozonants, light-protection means, UV stabilisers, UV absorbers or UV blockers, lubricants, mould-release agents, separating means, chain-lengthening additives, colourants, marking means, inorganic pigments, organic pigments, IR absorbers, NIR absorbers, photochromic agents, optical brighteners, polytetrafluoroethylene, halogen-free flame retardants, natural layer silicates, synthetic layer silicates, and fillers with a relative permittivity of at most 3.5.

11. The polyamide moulding compound according to claim 1, wherein the moulding compound has a weld line strength, determined according to EN ISO 178 (2010), of at least 200 MPa.

12. The polyamide moulding compound according to claim 1, wherein component (A) consists only of components (Aa) and (Ab), and/or the polyamide moulding compound consists only of components (A), (B), and (C).

13. A moulded article which comprises a polyamide moulding compound according to claim 1.

14. The moulded article according to claim 13, wherein the moulded article is a component, housing, or housing part of a device which communicates with an electromagnetic wave at a frequency of 0.3 to 300 GHz.

15. The moulded article according to claim 14, wherein the moulded article is selected from the group consisting of components, housings or housing parts of transmitting- and receiving devices, mobile phones, tablets, laptops, navigational devices, monitoring cameras, photographic cameras, sensors, diving computers, audio units, remote controls, loudspeakers, headphones, radio sets, television sets, household appliances, kitchen appliances, door- or gate openers, operating devices for the central locking in vehicles, keyless-go vehicle keys, temperature measuring- or temperature display devices, measuring devices and control devices.

* * * * *